United States Patent
Hayakawa

(10) Patent No.: US 6,244,519 B1
(45) Date of Patent: *Jun. 12, 2001

(54) WELDING TORCH HAVING ITS NOZZLE MEMBER PROVIDED WITH FUME COLLECTING HOOD

(75) Inventor: Yoshihisa Hayakawa, Yamato (JP)

(73) Assignee: Masae Hayakawa, Kanagawa-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,134

(22) Filed: May 8, 1998

(51) Int. Cl.⁷ .................................. B05B 1/24; B05B 1/28
(52) U.S. Cl. .............................. 239/83; 239/120; 239/288
(58) Field of Search ................................ 239/104, 120, 239/288, 79, 81, 83

(56) References Cited

U.S. PATENT DOCUMENTS 4,388,514 * 6/1983 Coughlin .................................. 219/69
5,129,579 * 7/1992 Conte ................................. 239/104 X
5,756,155 * 5/1998 Tzeng et al. ....................... 239/120 X
5,830,334 * 11/1998 Kobayashi ......................... 239/104 X

FOREIGN PATENT DOCUMENTS

| 49-57525 | 8/1947 | (JP) . |
| 50-129627 | 4/1949 | (JP) . |
| 50-151821 | 6/1949 | (JP) . |
| 51-7417 | 7/1949 | (JP) . |
| 50-62837 | 5/1975 | (JP) . |
| 5-280 | 1/1993 | (JP) . |
| 673777 * | 7/1979 | (SU) ..................................... 239/120 |
| 1563777 * | 5/1990 | (SU) ....................................... 239/81 |

* cited by examiner

Primary Examiner—Lesley D. Morris
(74) Attorney, Agent, or Firm—Ladas & Parry

(57) ABSTRACT

A welding torch with an inert gas injection nozzle provided around a distal end of an electrode and a fume collecting hood defining a suction port disposed around the distal end of the nozzle. The fume collecting hood has an exhaust port and the fume collecting hood preferably defines an open interior space in the hood so as to form an unobstructed passage for suction gas between the suction port and the exhaust port. The suction port is preferably provided with a flange disposed around a peripheral edge of thereof.

16 Claims, 4 Drawing Sheets

WELDING TORCH HAVING ITS NOZZLE MEMBER PROVIDED WITH FUME COLLECTING HOOD

BACKGROUND OF THE INVENTION

1. Field of the Invention

The present invention relates to a torch for TIG welding, $CO_2$ gas shielded arc welding or the like used for metal welding or cutting.

2. Description of the Related Art

TIG welding, MIG welding, $CO_2$ gas shielded welding or the like widely used in the related industries usually utilize inert gas to shield arc as well as molten pool (welded zone) from the ambient atmosphere so that the molten metal may be protected from contact with harmful gas and thereby a welded joint of high quality may be obtained.

During operation of such welding, the enterprise is obliged to take an effective preventive measure, particularly for the operation of welding performed within the indoor workshop, in conformity with the regulations so that the operator may be protected from pneumoconiosis (welder's lung) caused by inhaling said metallic fume.

Specifically, the indoor workshop must be provided with general or at least local forced ventilation equipment in order to protect the operator from inevitably inhaling of said metallic fume and more strictly from exposure thereto.

However, it is sometimes difficult to install said forced ventilation equipment in order that the operator can easily move one welded zone to the next zone to be welded and convenience for operation can be ensured. In this case, the operator must wear a dustproof mask during operation of welding.

Regrettably, the dustproof mask imposes the wearer a breathing resistance. Additionally, light-shielding goggles (or spectacles) make it difficult to wear the dustproof mask or to fit the dustproof mask to the operator's face. In consequence, a dustproof effect may be unacceptably deteriorated or the operator's skin may suffer from eczema appearing on a region closely contacted by the dustproof mask. To avoid these problems, the operator often works without wearing of the dustproof mask.

There have already been several welding torches made on experimental basis provided on their outer peripheral walls with suction ports for welding fume as well as inert gas. However, none of these trial torches has been put to practical use for the reason that they are of heavy weight unacceptably for the operator and unable to achieve a desired ventilating effect.

Purpose of utilizing inert gas in the arc welding processes is to substitute the ambient atmosphere present in the vicinity of the molten pool with this inert gas and thereby to obtain a welded joint of high quality. However, so far as the indoor workshop (inclusive of the operation performed within a tank) is concerned, there may be an apprehension that not only a welder but also the other persons working in the proximity of this welder might inhale the metallic fume generated from the molten pool or at least might be exposed to such metallic fume. Additionally, there is a possibility that the inert gas utilized for shielding purpose also might affect the health of the welder if the inert gas is inhaled by the welder.

SUMMARY OF THE INVENTION

In view of the problems as have been described above, it is a principal object of the invention to provide an improved welding torch provided at its distal end with a hood adapted to collect harmful substances such as metallic fume. More specifically, said collection hood should effectively suck various harmful gases such as the welding fume to protect the welder and the other persons working in the vicinity of this welder from inhaling such harmful gases and/or being exposed thereto. It is also important for this collection hood to prevent said harmful gases from being scattered and diffused in a workshop. Finally, such preventive effect should be achieved without significantly disturbing the operation of welding.

The object set forth above is achieved, according to the invention, by features as will be described:

Welding torch comprising an inert gas jet nozzle surrounding a distal end of an electrode to gas-shield a welded zone and a suction port surrounding a distal end of said nozzle, said welding torch being characterized by that said inert gas jet nozzle is provided with a fume collecting hood. Said fume collecting hood surrounds the distal end of said inert gas jet nozzle so as to define said suction port between said nozzle and is detachably attached to said welding torch.

The fume collecting hood is attached to a gas shield cup defined by the distal end of the welding torch's nozzle. As has already been described, the fume collecting hood is provided with the suction port through which the welding fume generated from the molten pool together with the inert gas. A flexible pipe connected to an inlet side of a high static pressure exhaust blower or vacuum generator opens at the depths of the hood's skirt. Immediately after the inert gas shielded welding has been stabilized or as soon as the welding is started, air suction is started to collect the welding fume generated from the molten pool into the hood together with the inert gas without diffusing the inert gas in the ambient atmosphere.

A spatter and/or rough dust filtering mesh is disposed at an appropriate position between said opening of the pipe and said suction port of the hood. This screening mesh well avoids damage or clogging of said pipe due to welding fume and/or rough dust which otherwise might enter said flexible pipe.

A flange extending outward from the peripheral edge of the hood's opening and its particular configuration serve to improve a suction rate (or suction range) achieved in front of the hood and thereby to improve a collecting efficiency of the welding fume and the inert gas. In addition, the optimal suction vector is achieved by said flange and its configuration and thereby a desired shielding effect of the inert gas for the molten pool can be reliably maintained.

DESCRIPTION OF THE PREFERRED EMBODIMENTS

Details of the inventive welding torch having a nozzle provided with a fume collecting hood will be more fully understood from the description of preferred embodiments given hereunder in reference with the accompanying drawings. It will be apparent to those skilled in the art to change or modify the respective members constituting these embodiments at the conventional technical level in the art. Therefore, the specific embodiments as will be described and illustrated should not be understood to define the scope of the invention unless there is a proper reason for it.

Figure 6:
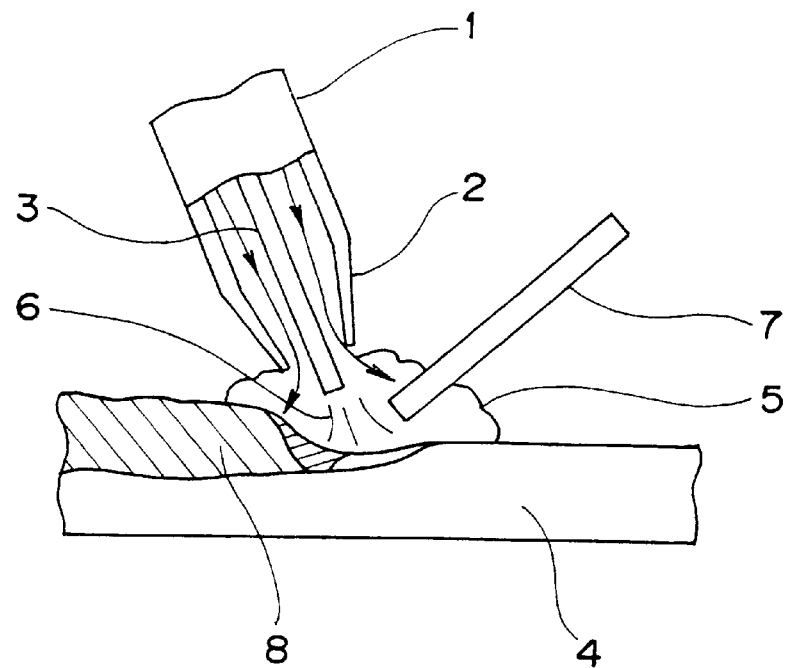
FIG. 6 is a diagram of a MIG welding torch according to the invention as partially broken away to illustrate a manner in which this MIG welding torch operates.

FIG. 6 schematically illustrates a manner in which so-called TIG welding, typical one of the inert gas arc welding, is carried out as well as the welding torch used for this welding. As illustrated, the welding torch 1 is formed in the proximity of a distal end thereof with a gas nozzle 2. An electrically conductive member concentrically provided within said welding torch 1 holds a cylinder shaped tungsten electrode 3 with its distal end extending outward from an opening of said nozzle 2. As indicated by arrows, inert gas is jetted from said nozzle opening through a gap defined between said gas nozzle 2 and said electrode 3 so as to substitute atmosphere present near a zone of base metal 4 to be welded by atmosphere 5 consisting of said inert gas. Simultaneously, an appropriate level of voltage is applied between the electrode 3 and the base metal 4 opposed to said electrode 3 to generate an arc 6 in said inert gas atmosphere 5. A welding rod 7 is fed into the arc 6 so that the arc welding may be achieved in said inert gas atmosphere 5. Reference numeral 8 designates weld metal.

Said nozzle 2 of torch 1 is formed on appropriate angular ranges around its outer peripheral surface with male screws or hood receiving grooves by means of which the fume collecting hood is attached to the torch 1.

The typical inert gas used for said TIG welding is argon gas which is sometimes used in the form of a mixture with oxygen, $CO_2$ gas, hydrogen, nitrogen, etc., if desired.

The electrode 3 can be roughly classified into an inconsumable tungsten rod used for said TIG welding and consumable metal wire 3a (serving also as additive) used for MIG welding.

The MIG welding using inexpensive $CO_2$ gas as inert gas is well known and referred to as the $CO_2$ gas shielded welding.

Figure 7:
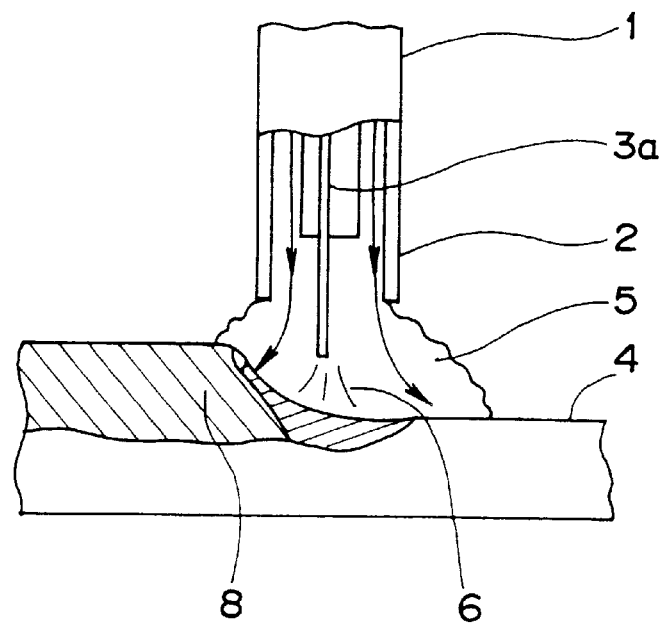
FIG. 7 is a diagram of a $CO_2$ gas shielded arc welding torch as partially broken, away to illustrate a manner in which this $CO_2$ gas shielded welding torch operates.

FIG. 7 is a diagram schematically illustrating a manner in which the $CO_2$ gas shielded arc welding is carried out.

In FIG. 7, the reference numerals similar to those used in FIG. 6 designate the members similar to those designated by the corresponding reference numerals in FIG. 6. However, it should be understood that the metal wire 3a is used also as the additive which is gradually consumed as the operation of welding proceeds and therefore fresh metal wire must be continuously fed to the nozzle during the operation.

Similarly to the case of said TIG welding, the torch 1 used for the $CO_2$ gas shielded arc welding is formed over appropriate angular ranges around its outer peripheral surface with male screws or guide grooves by means of which the fume collecting hood is attached to the torch 1.

In other words, the fume collecting hood 9 as will be described more in detail can be adapted for the torch used said either inert gas shielded arc welding and can properly function as has been described above in either case.

Figure 1:
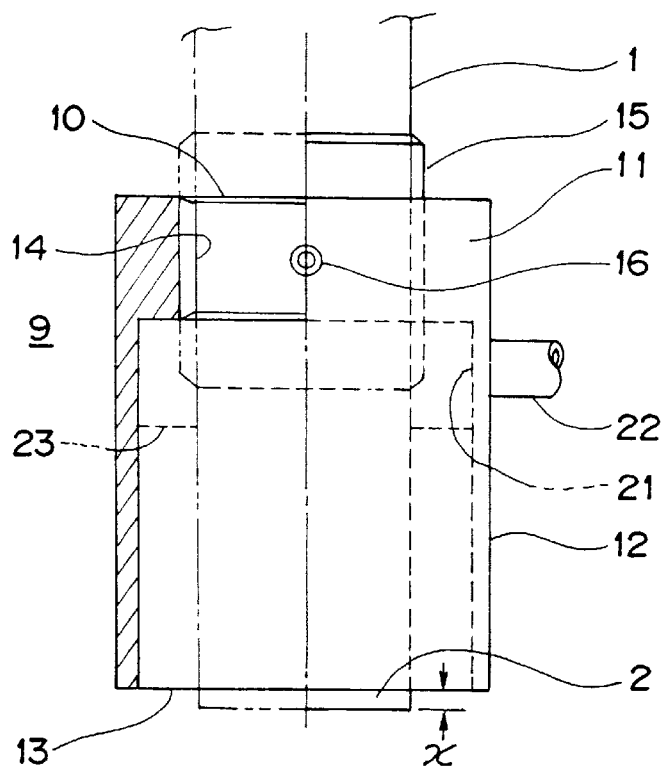
FIG. 1 is a schematic side view showing an important part of a welding torch provided with a fume collecting hood according to a first embodiment of the invention as partially broken away.

FIG. 1 is a side view showing an embodiment of said fume collecting hood 9 as partially broken away. As shown, this fume collecting hood 9 comprises a disc-shaped base 11 centrally formed with a concentric opening 10 adapted to receive the nozzle 2 and a thin-walled cylindrical member 12. Said member 12 has an outer diameter equal to an outer diameter of said base 11. One end of said member 12 defines an opening 13.

Said opening 10 of the base 11 adapted to receive the nozzle 2 is formed on its inner peripheral surface with female threads 14. Said female threads 14 cooperate with the male threads 15 formed over the appropriate angular ranges around the outer peripheral surface of the nozzle 2 as has previously been described with respect to the welding torch 1. More specifically, these male threads 15 are somewhat loosely engaged with said female threads 14 and thereby said fume collecting hood 9 is detachably attached to the welding torch 1.

Said base 11 of the fume collecting hood 9 has a thickness sufficient to ensure that the screw-cutted region of said base 11 can maintain a coaxial relationship with the torch 1. In addition, there is provided with a set screw 16 extending orthogonally to said female threads 14 to fix the position of the fume collecting hood 9 at which said fume collecting hood has been adjustably engaged with the torch 1.

To achieve this, several changes or modifications are required for the nozzle 2 of the conventional torch 1 for the inert gas shielded welding (FIG. 1 shows the case of $CO_2$ gas shielded arc welding). Specifically, the outer peripheral surface of the torch 1 (or the nozzle 2) must be formed with the male threads 15 adapted to cooperate with the female threads 14 formed on the base 11 of the fume collecting hood 9, as has already been described.

These male threads 15 must be dimensioned so as to be somewhat loosely engaged with the female threads 14. Such measure must be taken in view of a fact that the nozzle itself thermally expands due to heat, radiation and/or conductive heat generated during operation of welding. Thermal expansion of the nozzle itself prevents engagement as well as disengagement between the torch 1 and the fume collecting hood 9 from being smoothly achieved. To avoid this, the female threads 14 must have an appropriate looseness.

Provision of the set screw 16 is essential to compensate this looseness.

The base 11 of the fume collecting hood 9 may be provided adjacent the female threads 14 with an annular groove and heat-resisting packing may be fitted thereinto, if desired. An interface between the base 11 and the outer peripheral surface of the torch 1 can be reliably sealed thereby.

Relative position of the welding torch 1 and the fume collecting hood 9 in their assembled state should be able to meet, without disturbing an actual operation of the inert gas shielded welding, requirements as following: The nozzle 2 as well as the electrode 3 of the welding torch 1 can be introduced into the inert gas atmosphere and form a stable arc with a displacement of said electrode 3 relative to the skirt opening 13 of the fume collecting hood 9 by a length x as measured toward the base metal or toward the hood base. Additionally, the welded zone can be visually observed during the operation of welding.

Furthermore, the end of said skirt opening 13 must be placed sufficiently adjacent to the outlet of the nozzle 2 to ensure that most of the inert gas discharged from the nozzle 2 into the atmosphere can be recovered through said skirt opening 13 of the fume collecting hood 9.

To this end, said skirt opening 13 of the fume collecting hood 9 may have a configuration appropriately modified. Accordingly, the skirt 12 of the fume collecting hood 9 may have a cross-section other than the circular cross-section.

As will be apparent from the foregoing description, the welding torch 1 lies in a concentric relationship with the skirt 12 within a space defined by said skirt 12 after the fume collecting hood 9 has been attached to the welding torch 1. Thus, said space defined by said skirt 12 is cylindrical and the opening (suction port) 13 presents an annular shape around the welding torch 1.

It is assumed now that the fume collecting hood 9 is provided with an exhaust port 21 extending through the cylindrical skirt wall 12 adjacent the base 11 and outside air is sucked through said annular opening 13. With such arrangement, most of the inert gas which has been supplied through the nozzle 2 into the atmospheric air to gas-shield the welded zone during the operation of welding and effectively used for this purpose can be recovered together with the metallic fume generated in said welded zone and transported by the suction gas stream through said annular opening 13 surrounding the molten pool toward said exhaust port 21. In this case, the suction volume achieved through the annular opening 13 of the fume collecting hood 9 should be regulated, depending on various factors such as efficiency of gasshielding for the welded zone and recovery efficiency for inert gas as well as for metallic fume.

The annular opening (suction port) 13 is preferably not so spaced from the inert gas atmosphere, on one hand. However, from the viewpoint of convenience for the operation of welding, on the other hand, the lower edge of the annular opening 13 often obstructive for the operation of welding.

These effects conflicting with each other are balanced by position adjusting means such as the screw means formed on the fume collecting hood 9 as well as on the nozzle 2 and the guide grooves formed on said nozzle 2.

The metallic fume is not completely transported by the suction gas stream to the exhaust port but partially deposits on the skirt wall of the fume collecting hood 9, progressively increasing an exhaust resistance for a long period. Said screw means and guide grooves facilitate the fume collecting hood 9 to be separated from the welding torch 1 for cleaning of said hood 9.

In addition, it is sometimes impossible to carry out the operation of welding with the fume collecting hood 9 attached to the torch 1, depending on a particular zone to be welded. Said screw means and guide grooves are convenient in such case to detach the fume collecting hood 9 from the torch 1.

The metallic fume recovered by the fume collecting hood 9 together with the used inert gas is often at a temperature sufficiently high to damage a flexible exhaust duct 22 connected to the exhaust port of the hood 9. Otherwise, there is an apprehension that the metallic fume might clog said exhaust duct 22.

To avoid such trouble, there is provided a filter mesh 23 made of heat-resisting material within the inner space or the suction stream passage extending from the annular opening (suction port) 13 of the fume collecting hood 9 to the exhaust port 21 in order to filter the metallic fume at the high temperature.

However, said filter mesh 23 should be carefully selected so that a pressure loss due to the presence of said filter mesh 23 be acceptable for a desired exhaust effect. It is also important that said filter mesh can be easily exchanged with fresh filter mesh when the screen has been clogged with the metallic fume.

For example, when a sudden rise of the exhaust head is displayed, the filter mesh must be cleaned or exchanged with fresh filter mesh.

Generally, not only a relatively high mechanical strength but also a relatively high heat-resistance are required for the material used to form the fume collecting hood 9 in view of a fact that it is exposed to radiation heat from the molten pool as well as the arc and the metallic fume deposits thereon. However, the skirt 12 once heated radiates its heat into the atmospheric air and is cooled by a stream of gas and air entering the skirt 12 through the annular opening 13. In this manner, a heat balance is established.

The present embodiment facilitates an environment management even for a workshop requiring frequent movement from one welded zone to the other welded zone. To achieve this, there may be provided at a spot within the workshop with a stationary exhaust or vacuum equipment of a large capacity and a flexible exhaust duct 22 may be connected to each fume collecting hood 9 of the welding torch 1. Furthermore, being thin-walled, compact and of light weight, there is substantially no apprehension that the hood 9 attached to the welding nozzle might obstruct the operation of welding.

Figure 2:
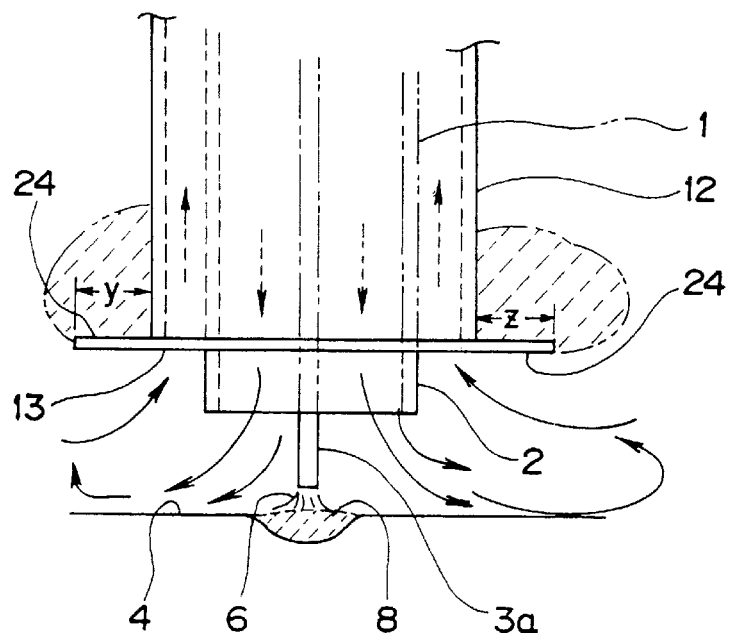
FIG. 2 is a view similar to FIG. 1 showing an important part of a welding torch provided with a fume collecting hood according to a second embodiment of the invention.

FIG. 2 shows a second embodiment of the invention according to which the fume collecting hood 9 is provided around the edge of the skirt opening with a flange 24. The flange 24 allows the surfaces to be worked such as those of the molten pool, the electrode and the welding rod to be further reliably shielded by the inert gas from the atmospheric air covering said surface to be worked. Moreover, said flange 24 contributes to improvement of the inert gas recovery efficiency as well as the metallic fume recovery efficiency by the fume collecting hood 9. It should be understood that the shape of said flange 24 as viewed in a plan view is not limited to the circular shape.

In the cases of TIG- or MIG-welding, the flange 24 may be partially broken away so that the presence of said flange 24 might not interfere with feeding of the welding rod.

In FIG. 2, reference numerals similar to those used in FIG. 1 designate the members similar to those designated by the corresponding reference numerals in FIG. 1.

The present embodiment can be adapted also for semi-automatic or automatic welder.

Figure 3:
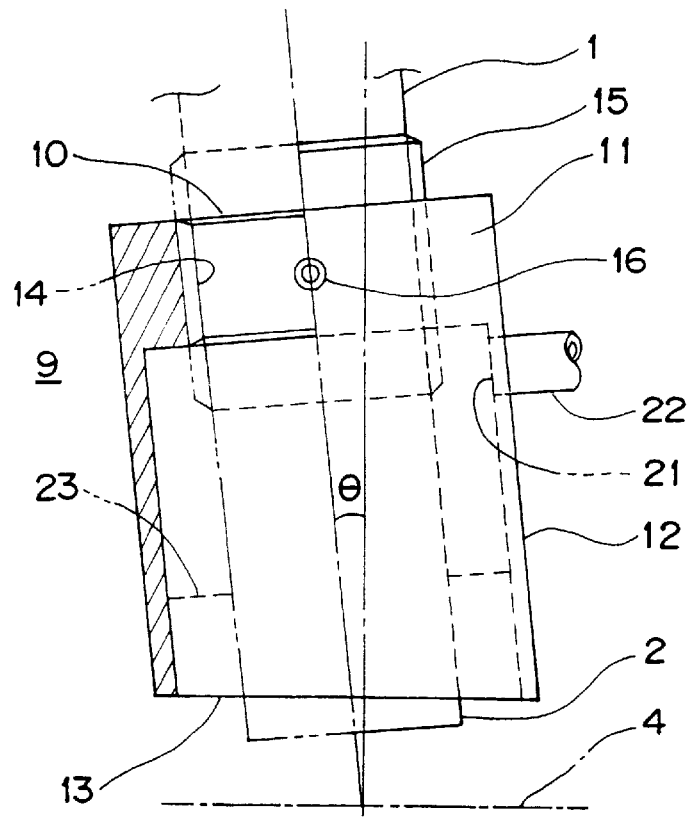
FIG. 3 is a view similar to FIG. 1 showing an important part of a welding torch provided with a fume collecting hood according to a third embodiment of the invention.

FIG. 3 is a side view showing a third embodiment of the fume collecting hood 9 as partially broken away.

In FIG. 3, the reference numerals similar to those used in FIG. 1 designate the members similar to those designated by the corresponding reference numerals in FIG. 1.

Depending on a particular kind of welding, the operation of welding is carried out with an axis of the welding torch 1 being oriented to the base metal not vertically to but obliquely at an angle of θ. When the angle θ is excessively large, the opening edge of the skirt 12 of the fume collecting hood 9 may come, at one side of said edge, in contact with the base metal and, at the other side of said edge, may be too spaced from said base metal to achieve uniform suction of the metallic fume and the inert gas. This is for the reason that, while the nozzle 2 is substantially not affected by said angle θ because of its relatively small diameter, orientation of said hood 9 is severely restricted because of its relatively large diameter.

In order to achieve the recovery as uniform as possible, the skirt 12 of the hood 9 is obliquely cut at the angle θ on the basis of an average tilt angle θ. Except for this feature, the present embodiment is identical to the first embodiment and therefore the hood 9 can be easily formed.

The fume collecting hood 9 according to this embodiment also may be provided around the edge of the skirt opening with said flange 24, if desired.

Obviously, the fume collecting hood 9 according to this specific embodiment is to be used with the opening 13 of the skirt 12 held in parallel to the base metal surface as will be apparent from FIG. 3. Theoretically, it is possible for this hood 9 to suck the inert gas as well as the metallic fume as uniformly as possible without diffusing them into the ambient atmospheric air.

With all of the embodiments as have been described above, the relative displacement x between the nozzle 2 of the welding torch 1 and the skirt opening 13 of the fume collecting hood 9 can be adjusted not stepwise but continuously. Specifically, the hood 9 may be rotated to obtain the optimal relative position.

Figure 4:
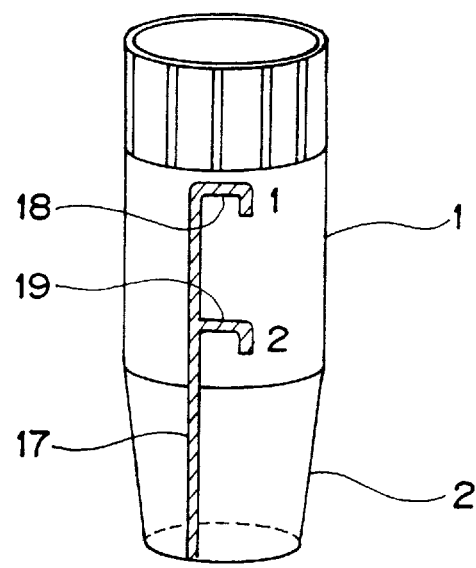
FIG. 4 is a perspective view illustrating a variant of arrangement for assembling the welding torch with the fume collecting hood according to a fourth embodiment of the invention.

It is assumed here that a content of the operation is predetermined and the optimal relative position is previously given on the basis of various experimental data. For example, concerning ordinary welding or welding of a recessed corner, the outer peripheral surface of the torch 1 is provided along its generatrix with a guide groove 17 used to attach the fume collecting hood 9 to the torch 1 according to a fourth embodiment shown by FIG. 4 (while the fourth embodiment is in the form of TIG welding torch, it is not limited thereto). In addition to said guide groove 17, there are provided at desired levels longitudinally of the torch 1 L-shaped grooves 18, 19 being respectively continuous with said guide groove 17 to position the hood 9. As will be readily understood, it is unnecessary for the base 11 of the fume collecting hood 9 to have the male threads on the inner peripheral surface of the nozzle receiving opening 10. Instead of said male threads, said inner peripheral surface is provided with a pin adapted to be engaged with said grooves 17 and 18 or 19.

The torch 1 is fitted into the nozzle receiving opening 10 extending through the base 11 of the fume collecting hood 9 while the pin projecting from the inner peripheral surface of said opening 10 is engaged with the guide groove 17 formed on the outer peripheral surface of said torch 1. Now a degree of freedom is left for the relative position of the torch 1 and the hood 9 only longitudinally of the torch 1. Assumed that the upper positioning L-shaped groove 18 is provided as an uppermost position limiting stopper and the pin on the inner peripheral surface of said opening 10 is engaged with said L-shaped groove 18, the nozzle 2 is positioned so as to project outward beyond the skirt opening 13 of the hood 9.

In this way, the welding assembly of nozzle 2 and the hood 9 is ready for welding of a recessed corner.

Assuming that the lower positioning L-shaped groove 19 is provided as a lowermost position limiting stopper for ordinary welding, said pin may be engaged with said L-shaped groove 19 when it is desired to carry out such ordinary welding. (Numeral 20 in FIG. 5 indicates the pin.)

In this manner, the position of the fume collecting hood 9 relative to the torch 1 can be efficiently adjusted by a single operation.

Figure 5:
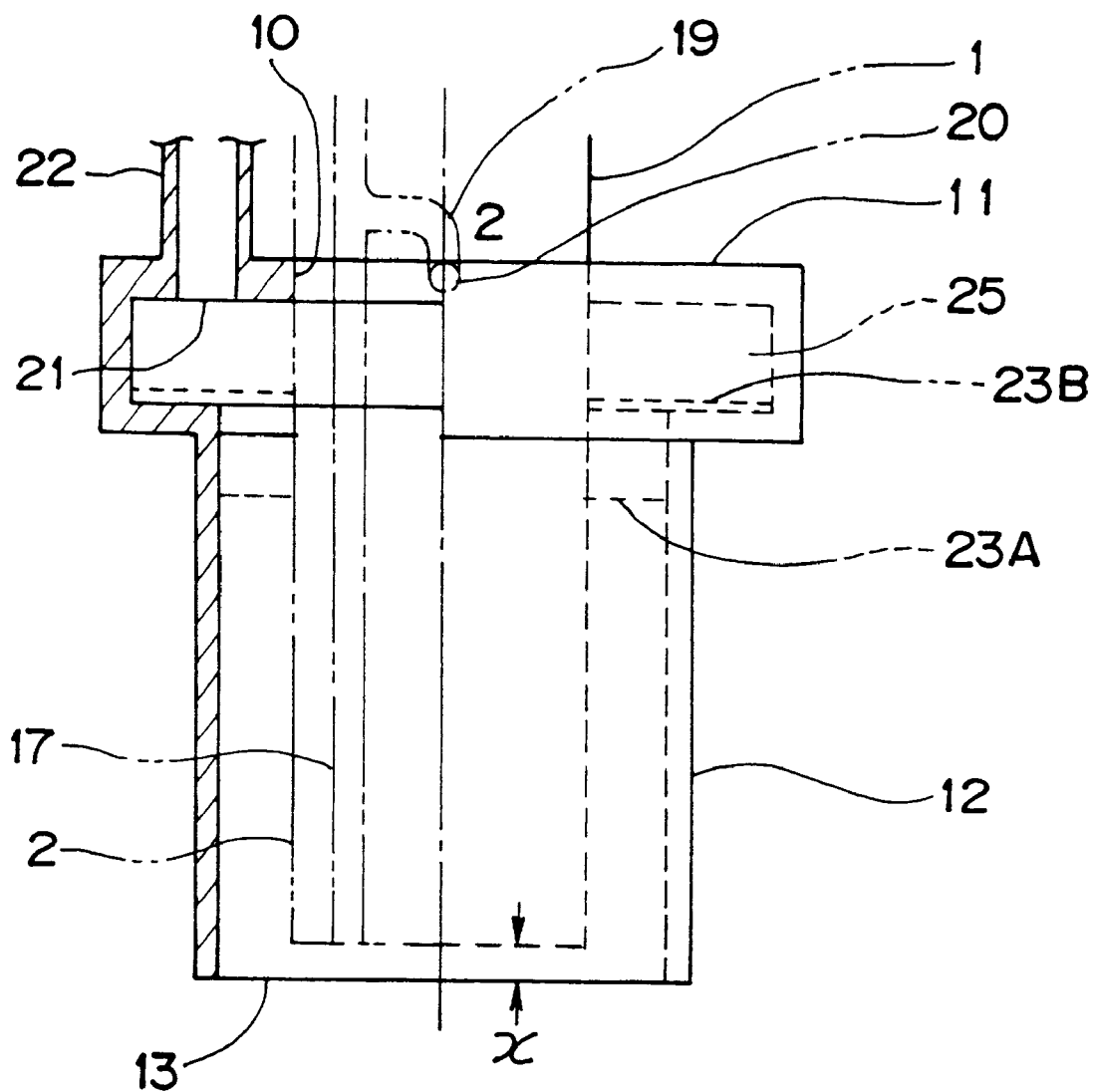
FIG. 5 is a view similar to FIG. 1 showing an important part of a welding torch provided with a fume collecting hood according to a fifth embodiment of the invention.

According to a fifth embodiment shown by FIG. 5, a diameter-enlarged space extending diametrically of the hood 9 is provided within the inner space or the passage of suction gas stream defined between the suction port 13 and the exhaust port 21 of the fume collecting hood 9.

Referring to FIG. 5, said diameter-enlarged space is provided in the form of a relatively large annular cavity 25 within the base 11 which contributes to alleviate an exhaust resistance occurring at the exhaust port 21 as effectively as possible and thereby to improve an exhaust efficiency. Velocity of the suction gas stream is adequately reduced within the cavity 25 to prevent dust or the like from being sucked into the exhaust duct.

Furthermore, the arrangement according to this embodiment eliminates uneven suction rate which otherwise might occur at the suction port 13. Consequently, stabilized suction occurs under the uniform condition through every point of the suction port 13.

The diameter-enlarged cavity 25 may be provided with filter mesh 23 to achieve further effective filtration of rough dusts or the like owing to its correspondingly large filtration area. Numerals 23A and 23B indicate the filter mesh respectively.

In FIG. 5, reference numerals similar to those used in FIG. 1 designate the members similar to those designated by the corresponding reference numerals in FIG. 1.

As has previously been described, the present embodiment adopts an arrangement such that the welding torch 1 has its outer peripheral surface held by the nozzle receiving opening 10 extending through the base 11 of the fume collecting hood 9 and, if desired, additionally by a support arm projecting from the inner surface of the skirt 12. Assembling of the hood 9 to the torch 1 is completed by engagement of the pin 20 projecting from the inner peripheral surface of said opening 10 with the guide groove 17 formed on the outer peripheral surface of the torch 1. It should be understood that present embodiment may adopt the structure for assembling those two components as has been described in connection with the first embodiment.

In the present embodiment also, the opening edge of the skirt may be provided with the flange 24 similarly in the third embodiment, if desired.

All the embodiments have been described hereinabove exclusively with respect to the case in which the fume collecting hood is used with the torch for $CO_2$ gas shielded arc welding or TIG welding, it will be easily understood that the fume collecting hood of the previously described construction offers the same function also when it is used with the torch for MIG welding, etc.

In operation of welding with use of inert gas to shield the molten pool from the ambient atmospheric air, the assembly according to the invention protects not only the operator carrying on welding but also the other operators working in the proximity of said operator from inhaling or being exposed to the welding fume generated from the molten pool as well as various kinds of inert gas used for shielding. Moreover, this novel assembly allows welding of high quality to be efficiently carried out substantially without obstructing the operation of welding. In this manner, working environment is drastically improved and occurrence of accidents is practically eliminated.

What is claimed is:

1. Welding torch having its inert gas injection provided with a fume collecting hood characterized in that said nozzle provided around a distal end of an electrode so as to gas-shield a welded zone and there is provided a suction port around a distal end of said nozzle, said fume collecting hood defining said suction port around said distal end of said inert gas injection nozzle is formed around a peripheral edge of said suction port, wherein a relative position at which said fume collection hood and said nozzle are assembled together can be adjusted and thereby a relative displacement (x) between said suction port and an outlet of said nozzle can be adjusted.

2. Welding torch according to claim 1, wherein said relative displacement (x) between said suction port and said outlet of said nozzle can be adjusted so that said outlet of said nozzle projects outwardly from said suction port.

3. Welding torch according to claim 1, wherein said fume said relative displacement (x) between said suction port and said outlet of said nozzle can be adjusted so that said outlet of said nozzle stands back from said suction port.

4. Welding torch according to claim 1, wherein said fume said relative displacement (x) between said suction port and said outlet of said nozzle can be adjusted so that said outlet of said nozzle and said suction port are in the same position.

5. Welding torch according to claim 1, wherein said fume collecting hood defining said suction port around said distal end of said inert gas injection nozzle is detachably attached to said welding torch.

6. Welding torch according to claim 1, wherein said suction port defined around said inert gas injection nozzle is provided with filter mesh serving to prevent spatter and/or rough dust from being sucked through said suction port.

7. Welding torch according to claim 1, wherein a diameter-enlarged space extending diametrically of said fume collecting hood is formed in a passage of a suction gas stream defined between said suction port and an exhaust port of said fume collection hood.

8. Welding torch according to claim 1, the suction port being provided with a flange disposed around a peripheral edge thereof.

9. Welding torch comprising:
   an inert gas injection nozzle provided around a distal end of an electrode;
   a fume collecting hood defining a suction port disposed around distal end of nozzle, said fume collecting hood having an exhaust port and having an open interior space so as to form an unobstructed passage for suction gas between said suction port and said exhaust port;
   a relative position at which said fume collection hood and said nozzle are assembled together that can be adjusted and thereby, providing a relative displacement (x) between said suction port and outlet of said nozzle that can be adjusted.

10. Welding torch according to claim 9, wherein said fume collecting hood surrounds said nozzle in concentric manner and wherein said interior space cylindrically shaped and is disposed between an inner wall of said hood and said nozzle so as to form throughout an entire passage of suction gas stream.

11. Welding torch according to claim 9, wherein said relative displacement (x) between said suction port and said outlet of said nozzle can be adjusted so that said outlet of said nozzle projects outwardly from said suction port.

12. Welding torch according to claim 9, wherein said fume said relative displacement (x) between said suction port and said outlet of said nozzle can be adjusted so that said outlet of said nozzle stands back from said suction port.

13. Welding torch according to claim 9, wherein said fume said relative displacement (x) between said suction port and said outlet of said nozzle can be adjusted so that said outlet of said nozzle and said suction port are in the same position.

14. Welding torch according to claim 9, wherein said collecting hood is detachably attached to said welding torch.

15. Welding torch according to claim 9, wherein a diameter-enlarged space extending radially outwardly of said fume collecting hood is formed in a passage of a suction gas stream defined between said suction port and an exhaust port of said fume collection hood.

16. Welding torch according to claim 9, said suction port being provided with a flange disposed around a peripheral edge thereof.

* * * * *